United States Patent Office 3,778,419

Patented Dec. 11, 1973

1

3,778,419

VULCANIZATION PROCESS WITH S,S'-CARBONYL-BIS-DIALKYLDITHIOPHOSPHATE

Rudiger Schubart, Ulrich Eholzer, Theo Kempermann, and Ernst Roos, Cologne, Germany, assignors to Bayer Aktiengesellschaft, Leverkusen, Germany No Drawing. Original application Dec. 21, 1970, Ser. No. 100,361, now Patent No. 3,697,433. Divided and this application Feb. 2, 1972, Ser. No. 222,978

Claims priority, application Germany, Jan. 13, 1970, P 20 01 151.2

Int. Cl. C08d *9/00, 13/28;* C08f *27/06*

U.S. Cl. 260—79.5 B 5 Claims

ABSTRACT OF THE DISCLOSURE

A process for the vulcanization of terpolymers of ethylene and propylene, also known as EPDM rubbers, is described. More particularly vulcanization accelerators for such a process having the formula

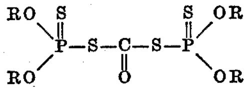

in which the radicals R represent the same or different straight chained or branched lower alkyl radicals, each of which may be substituted by a lower alkoxy group, are described.

CROSS-REFERENCE TO RELATED APPLICATION

This application is a division of application Ser. No. 100,361 filed Dec. 21, 1970 and now U.S. Pat. 3,697,433.

The present invention relates to a process for the vulcanization of terpolymers of ethylene and propylene, also known as EPDM rubbers, and more particularly to vulcanization accelerators for such a process.

As is well known, EPDM rubbers can be vulcanized with sulphur in the presence of an accelerator system which contains a conventional primary accelerator, e.g. one taken from the group of thiazole accelerators (see S. Boström, Kautschuk-Handbuch, volume 4, Stuttgart, 1961, pages 300–307) and as additional accelerators those taken from the group of thiuram and dithiocarbamate accelerators (see S. Boström, Kautschuk-Handbuch, Stuttgart, 1961, volume 4, pages 307–316) and optionally additional thioureas (see Technical Information Leaflet No. 20 of Farbenfabriken Bayer AG, published Jan. 2, 1969, Order No. KA 4519). Without the addition of dithiocarbamate accelerators, the aforesaid accelerator systems only reach vulcanization rates which are too slow for technical purposes. Although the addition of dithiocarbamate accelerators, such as zinc dimethyldithiocarbamate or zinc diethyl dithiocarbamate increases the vulcanization rate, it entails the serious disadvantage that these accelerator systems in many cases cause the formation of unwanted surface deposits ("bloom" on the surfaces of the vulcanizates (see Ullmann's Encyklopädie der technischen Chemie, 3rd Edition, publishers, Urban and Schwarzenberg, Munich, Berlin, 1957, volume 9, page 370).

In practice, the rate of vulcanization can only be increased to a very limited extent by increasing the amount of dithiocarbamate because larger amounts reduce the stability of the mixtures to such an extent that the process becomes unreliable (see Technical Information Leaflet No. 20 of Farbenfabriken Bayer AG, published Jan. 2, 1969, Order No. 4519).

The same applies to the addition of thioureas.

It has now been found that these disadvantages no longer occur in the vulcanization of ethylene propylene terpolymers in the presence of sulphur or sulphur donors

2 and vulcanization accelerators if one uses as vulcanization accelerators S,S'-carbonyl-bis-dialkyl dithiophosphates of the general formula

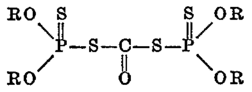

(I)

in which the radicals R denote the same or different straight chained or branched lower alkyl radicals each of which may be substituted by a lower alkoxy group, with the addition of a conventional thiazole accelerator and, if desired, also a compound taken from the group of thiuram or dithiocarbamate accelerators and/or optionally a thiourea. The lower alkyl radicals may have up to 6 carbon atoms and preferably have 1 to 4 carbon atoms. The lower alkoxy radicals mentioned above as substituents may have 1 to 4 and preferably have 1 to 3 C atoms. A lower alkyl radical R substituted with a lower alkoxy group may have a total of up to 10 carbon atoms.

The following are examples of radicals R in Formula I: Methyl, ethyl, n-propyl, isopropyl, n-butyl, isobutyl, secondary butyl, tertiary butyl, n-pentyl, 3-methylbutyl, 2-methylbutyl, 2-pentyl, 3-pentyl, 3-methyl-2-butyl, 2-methyl-2-butyl, 2,2-dimethylpropyl, n-hexyl, 2-hexyl, 3-hexyl, 4-methylpentyl, 3-methylpentyl, 2-methylpentyl, 4-methyl-2-pentyl, 3-methyl-2-pentyl,3-methyl-3-pentyl, 3-methyl-2-pentyl, 3,3-dimethylbutyl, 3,3-dimethyl-2-butyl, 2,2-dimethylbutyl, 2-methyl-3-pentyl, 2-ethylbutyl, 2-methyl-2-pentyl, 2,3-dimethylbutyl, 2,3-dimethyl-2-butyl, 2-methoxyethyl, 2-ethoxyethyl, 2-propoxyethyl, 2-isopropoxyethyl, 2-, ethoxypropyl, 2-ethoxypropyl, 2-propoxypropyl and 2-isopropoxypropyl.

The following are mentioned as examples of S,S'-carbonyl-bis-dialkyldithiophosphates which may be used in accordance with the invention:

S,S'-carbonyl-bis-dimethyl-dithiophosphate,
S,S'-carbonyl-bis-diethyl-dithiophosphate,
S,S'-carbonyl-bis-di-n-propyl-dithiophosphate,
S,S'-carbonyl-bis-di-isopropyl-dithiophosphate,
S,S'-carbonyl-bis-di-n-butyl-dithiophosphate,
S,S'-carbonyl-bis-diisobutyl-dithiophosphate,
S,S'-carbonyl-bis-di-sec.-butyl-dithiophosphate,
S,S'-carbonyl-bis-di-tert.-butyl-dithiophosphate,
S,S'-carbonyl-bis-di-n-pentyl-dithiophosphate,
S,S'-carbonyl-bis-di-2-methylbutyl-dithiophosphate,
S,S'-carbonyl-bis-di-2-pentyl-dithiophosphate,
S,S'-carbonyl-bis-di-3-pentyl-dithiophosphate,
S,S'-carbonyl-bis-di-3-methyl-2-butyl-dithiophosphate,
S,S'-carbonyl-bis-di-2-methyl-2-butyl-dithiophosphate,
S,S'-carbonyl-bis-di-n-hexyl-dithiophosphate,
S,S'-carbonyl-bis-di-2-hexyl-dithiophosphate,
S,S'-carbonyl-bis-di-3-hexyl-dithiophosphate,
S,S'-carbonyl-bis-di-4-methyl-pentyl-dithiophosphate,
S,S'-carbonyl-bis-di-2-methylpentyl-dithiophosphate,
S,S'-carbonyl-bis-di-2-methyl-2-pentyl-dithiophosphate,
S,S'-carbonyl-bis-di-3,3-dimethyl-butyl-dithiophosphate,
S,S'-carbonyl-bis-di-2,2-dimethylbutyl-dithiophosphate,
S,S'-carbonyl-bis-di-2-methyl-3-pentyl-dithiophosphate,
S,S'-carbonyl-bis-di-3-ethylbutyl-dithiophosphate,
S,S'-carbonyl-bis-di-2-methyl-pentyl-dithiophosphate,
S,S'-carbonyl-bis-di-2,3-dimethyl-butyl-dithiophosphate,
S,S'-carbonyl-bis-di-2-methoxyethyl-dithiophosphate,
S,S'-carbonyl-bis-di-2-ethoxyethyl-dithiophosphate,
S,S'-carbonyl-bis-di-2-propoxyethyl-dithiophosphate,
S,S'-carbonyl-bis-di-2-isopropoxyethyl-dithiophosphate,
S,S'-carbonyl-bis-di-2-methoxypropyl-dithiophosphate,
S,S'-carbonyl-bis-di-2-ethoxypropyl-dithiophosphate,
S,S'-carbonyl-bis-di-2-iso-propoxypropyl-dithiophosphate and
S,S'-carbonyl-bis-di-2-propoxypropyl-dithiophosphate.

One may, of course, also use S,S'-carbonyl-bis-dialkyl-dithiophosphates of Formula I which have been obtained from alcoholic mixtures, e.g. isomeric mixtures such as a mixture of various isomeric butanols or pentanols or commercial alcoholic mixtures containing alcohols with different numbers of carbon atoms. these mixtures consequently having various radicals R (Formula I).

The vulcanization accelerators preferably used are S,S'-carbonyl-bis-di-n-butyl-dithiophosphate and S,S'-carbonyl-bis-isobutyl-dithiophosphate.

The accelerator systems according to the invention in addition contain an accelerator from the group of thiazole accelerators, for example 2-mercaptobenzothiazole, dibenzothiazyl disulphide or the zinc salt of 2-mercaptobenzothiazole.

Additional accelerators taken from the group of thiuram and dithiocarbamate accelerators may also be used, e.g. tetramethylthiuram disulphide, tetraethylthiuram disulphide, tetramethylthiuram monosulphide, dimethyldiphenyl thiuram disulphide and/or thioureas such as diphenyl thiourea, ethylene thiourea, N,N'-dimethylthiourea, N,N'-diethylthiourea, N,N'-dibutylthiourea and thiourea itself.

The individual components of the accelerator system may advantageously be used in the amounts indicated below (in parts by weight based on 100.0 parts by weight of EPDM rubber):

S,S'-carbonyl-bis-dialkyl-dithiophosphate—approximately 0.1 to approximately 5.0
mercapto accelerator—approximately 0.2 to approximately 2.0
thiuram or dithiocarbamate accelerator—0 to approximately 2.0
thiourea—0 to approximately 2.0.

The quantity of sulphur to be used is about 0.2 to about 3.5 parts by weight based on 100.0 parts by weight of EPDM rubber, preferably 1.0 to 2.0 parts by weight. Sulphur donors such as N,N'-dithio-bis-morpholine, dipentamethylene thiuram tetrasulphide, N,N'-dithio-bis-hexahydro-2H-azepinone-(2) and 2-benzothiazyl-dithio-N-morpholide may also be used in quantities corresponding to the required amount of sulphur indicated.

The individual components of the accelerator system may be added to the EPDM rubbers or rubber mixtures before vulcanization either separately or in the form of a mixture or a preliminary mixture of rubber and accelerator (see Ullmann's Encyklopädie der technischen Chemie, 3rd Edition, publishers Urban und Schwarzenberg, Munich, Berlin, 1957, volume 9, page 364.

The EPDM rubbers may contain all the usual additives such as fillers, especially carbon blacks, mineral oils, plasticizers, tackifiers, accelerator activators, especially stearic acid, waxes, anti-oxidants, substances which protect against ozone, blowing agents, dyes or pigments.

Vulcanization of EPDM rubbers is generally carried out at temperatures of between about 120° C. and about 300° C., using any of the usual vulcanization processes employed in industry such as press heating, heating with steam, hot air, salt baths, fluidized beds, ultrahigh frequency or steam pipes.

The compounds of the General Formula I may be prepared by reacting $P_2S_5$ with the corresponding alcohol, neutralizing the resulting dithiophosphoric acid, preferably with an aqueous sodium or potassium hydroxide solution, and then phosgenating. The reaction may be explained by the following reaction scheme:

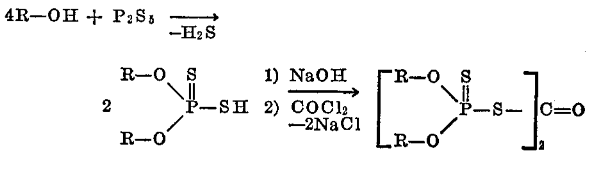

In addition to the commercial pure alcohols, one may also use mixtures of alcohols ROH. Both isomeric mixtures, for example mixtures of n-propanol and isopropanol or of n-butanol and isobutanol or the isomeric mixture of various pentyl alcohols and mixtures of alcohols with different numbers of C atoms, e.g. a mixture of 50% by weight of n-butanol and 50% by weight of n-pentanol may be used. One may, of course, also use commercial alcohol mixtures as well as mixtures which contain numerous individual alcohols of different chemical constitutions.

The reaction of phosphorus pentasulphide with alcohol or alcohol mixtures is carried out under normal or elevated pressure in a temperature range of 10° C. to 100° C., preferably at 30° C. to 50° C. and normal pressure. The reactants are advantageously put into the process in equimolar quantities although an excess or subequivalent amount of phosphorus pentasulphide may, of course, be used. Furthermore, phosphorus pentasulphide may be put into the reaction with the corresponding alcohol or alcohol mixture diluted with an inert organic solvent such as cyclohexane, benzene, toluene, xylene or diethylether, diisopropylether, tetrahydrofuran or dioxane. Alternatively, phosphorus pentasulphide may, of course, be suspended in one of the above-mentioned solvents and reacted in this form with the corresponding alcohol or alcohol mixture. It will generally be preferable to introduce the dry phosphorus pentasulphide into the reaction vessel and slowly add the undiluted alcohol or alcohol mixture. The dialkyl or dialkoxyethyldithiophosphoric acids obtained in this way are liquid compounds. For subsequent reactions, neutralization of the corresponding dithiophosphoric acid with ammonia or an amine such as triethylamine or pyridine may be carried out in another solvent such as diethylether, diisopropylether, dioxane, tetrahydrofuran, benzene, toluene or xylene but preferably, neutralization of dithiophosphoric acid is carried out in water, using an amine such as triethylamine or ammonia but more simply still with aqueous alkali metal hydroxide solutions such as sodium hydroxide or potassium hydroxide solution at room temperature. The salt solutions prepared in this way can now be directly converted into the corresponding S,S'-carbonyl-bis-dialkyl- or S,S'-carbonyl-bis-dialkoxyethyl-dithiophosphates by means of phosgene. The phosgenation reaction may be carried out in a temperature range of −20° C. to 100° C., preferably between −5° C. and 10° C., and the reactants may be used in stoichiometric quantity or phosgene may be used in excess. If the reaction is carried out in an aqueous phase, an inert organic solvent such as cyclohexane, benzene, toluene, xylene, chlorobenzene, dichloromethane, chloroform, carbon tetrachloride, ethylene chloride, diethylether or diisopropylether may be added.

As will be seen from the following examples, the vulcanization accelerators according to the invention are distinguished by their high resistance to premature vulcanization. They achieve a high vulcanization rate and excellent mechanical properties in the vulcanizates, in particular a low compression set (in accordance with DIN 53,517) and high tension values, tear resistances, elasticity and hardness. In particular, they do not cause blooming or matting of the surface of the vulcanizates. The compounds which have more than 3 carbon atoms in the alkyl radicals are practically odourless and do not impart an odour to the vulcanizates.

The vulcanization process according to the invention will be explained in the following examples. The test methods used are summarized in Table 1.

TABLE 1

| Modulus | |
|---|---|
| (1) Scorch time | Based on the Mooney Scorch time (see DIN 53 524) determined from the heating-time curve. Increase in at 200% elongation by 20 points above the minimum (stepwise heating). |
| (2) M 200, 300 | At 200 and 300% elongation (kg./wt./cm.²) DIN 53 504, sheet 2. |
| (3) F | Tear resistance (kg./wt./cm.²) DIN 53 504, standard ring R I. |
| (4) D | Elongation at break (percent) DIN 53 540, Sheet 1, Standard ring R I. |
| (5) H | Hardness (Shore A), DIN 53 505 region A, 4 mm. flaps. |
| (6) E | Recoil elasticity (percent) DIN 53 512, 4 mm. flaps. |
| (7) Compression set (percent). | Based on DIN 53 517; constant deformation cylinder 10 mm. in height, 10 mm. in diameter, time 22 hours/70° C. or 70 hours/100°. |
| (8) Blooming | 2 vulcanization plates (heating step 45 minutes/150° C.) were pressed with the tip of a finger over half of one surface and stored for 4 weeks at room temperature, one in the dark and the other in daylight, and then inspected with the naked eye for signs of blooming. |

EXAMPLE 1

The following EPDM rubber mixture was prepared in an internal mixer in the usual manner:

| | Parts by weight |
|---|---|
| A slowly vulcanizing type of EPDM containing dicyclopentadiene as diene component (Keltan 520) | 100.0 |
| A carbon black to improve extrudability (Corax A; FEF carbon black | 60.0 |
| An aliphatic mineral oil (Ingraplast NS) | 20.0 |
| Zinc oxide | 5.0 |
| Stearic acid | 1.0 |
| Sulphur | 1.5 |
| 2-mercaptobenzothiazole | 0.5 |
| Tetramethyl thiuram monosulphide | 0.5 |

The following accelerators were then mixed on a mill Mixture No.—

| | |
|---|---|
| 1: S,S′-carbonyl-bis-diethyl dithiophosphate | 1.2 |
| 2: S,S′-carbonyl-bis-n-propyl dithiophosphate | 1.2 |
| 3: S,S′-carbonyl-bis-isopropyl dithiophosphate | 1.2 |
| 4: S,S′-carbonyl-bis-(2-methoxyethyl) dithiophosphate | 1.2 |
| 5: S,S′-carbonyl-bis-n-butyl dithiophosphate | 1.2 |
| 6: Zinc diethyl dithiocarbamate | [1] 1.2 |
| 7: Without additive | (1) |

[1] For comparison.

Stepwise heating was carried out at 120° C., 150° C. and 170° C. with the above mixtures and the following data were obtained:

TABLE 2

Mixture number

| | 1 | | | | | | 2 | | | | | | 3 | | | | | |
|---|---|---|---|---|---|---|---|---|---|---|---|---|---|---|---|---|---|---|
| | F | D | M, 200 | M, 300 | H | E | F | D | M, 200 | M, 300 | H | E | F | D | M, 200 | M, 300 | H | E |
| 10 minutes at 120° C | 5 | 110 | ----- | ----- | 31 | 48 | 5 | 180 | ----- | ----- | 30 | 48 | 5 | 170 | ----- | ----- | 30 | 48 |
| 20 minutes at 120° C | 5 | 140 | ----- | ----- | 33 | 48 | 5 | 170 | ----- | ----- | 30 | 48 | 5 | 210 | 3 | ----- | 31 | 48 |
| 30 minutes at 120° C | 5 | 180 | 4 | 4 | 37 | 48 | 5 | 250 | 4 | ----- | 32 | 48 | 5 | 300 | 4 | 3 | 33 | 48 |
| 45 minutes at 120° C | 15 | 770 | 9 | 11 | 47 | 48 | 5 | 630 | 6 | 6 | 37 | 48 | 20 | 810 | 8 | 10 | 44 | 48 |
| 60 minutes at 120° C | 35 | 760 | 12 | 17 | 50 | 48 | 15 | 740 | 8 | 9 | 45 | 48 | 45 | 830 | 13 | 20 | 49 | 48 |
| 75 minutes at 120° C | 80 | 830 | 20 | 31 | 55 | 48 | 40 | 810 | 13 | 19 | 50 | 48 | 90 | 710 | 23 | 37 | 55 | 49 |
| 90 minutes at 120° C | 120 | 820 | 26 | 43 | 58 | 50 | 85 | 860 | 20 | 31 | 54 | 49 | 115 | 620 | 34 | 56 | 59 | 51 |
| 5 minutes at 150° C | 5 | 180 | ----- | ----- | 35 | 48 | 5 | 180 | ----- | ----- | 31 | 48 | 5 | 210 | 3 | ----- | 32 | 48 |
| 10 minutes at 150° C | 5 | 110 | ----- | ----- | 32 | 48 | 5 | 170 | ----- | ----- | 31 | 48 | 5 | 220 | 3 | ----- | 32 | 48 |
| 15 minutes at 150° C | 110 | 790 | 24 | 39 | 56 | 48 | 80 | 850 | 19 | 30 | 53 | 39 | 125 | 730 | 29 | 49 | 57 | 50 |
| 20 minutes at 150° C | 150 | 780 | 32 | 54 | 60 | 49 | 140 | 820 | 28 | 47 | 57 | 50 | 140 | 580 | 41 | 69 | 61 | 51 |
| 30 minutes at 150° C | 160 | 630 | 45 | 73 | 63 | 50 | 160 | 670 | 40 | 66 | 61 | 51 | 135 | 440 | 58 | 91 | 64 | 51 |
| 45 minutes at 150° C | 145 | 470 | 58 | 91 | 65 | 53 | 150 | 520 | 53 | 85 | 64 | 52 | 135 | 360 | 72 | 112 | 68 | 54 |
| 60 minutes at 150° C | 165 | 470 | 66 | 104 | 67 | 52 | 155 | 460 | 62 | 98 | 66 | 53 | 135 | 340 | 78 | 124 | 68 | 54 |
| 75 minutes at 150° C | 155 | 430 | 68 | 110 | 67 | 52 | 155 | 440 | 65 | 105 | 67 | 53 | 135 | 310 | 82 | 130 | 68 | 54 |
| 90 minutes at 150° C | 155 | 410 | 72 | 115 | 68 | 52 | 150 | 420 | 67 | 110 | 67 | 53 | 130 | 290 | 86 | 131 | 69 | 54 |
| 5 minutes at 170° C | 140 | 830 | 29 | 48 | 57 | 48 | 115 | 840 | 22 | 37 | 55 | 49 | 145 | 660 | 35 | 59 | 60 | 50 |
| 10 minutes at 170° C | 165 | 630 | 44 | 73 | 63 | 50 | 160 | 670 | 40 | 67 | 61 | 51 | 150 | 480 | 55 | 89 | 63 | 51 |
| 15 minutes at 170° C | 170 | 560 | 55 | 89 | 64 | 51 | 155 | 530 | 50 | 81 | 63 | 51 | 135 | 370 | 67 | 109 | 66 | 53 |
| Scorch time (min.) at 120° C | | | 83 | | | | | | 90 | | | | | | 75 | | | |
| Maximum modulus at 200% elongation time at 150° C. (limiting value 90 min./150° C., kg. wt./cm.²) | | | 72 | | | | | | 67 | | | | | | 86 | | | |
| Blooming | | | None | | | | | | None | | | | | | None | | | |
| Compression set (percent): | | | | | | | | | | | | | | | | | | |
| 22 hr./70° C | | | 9.1 | | | | | | 8.6 | | | | | | 7.8 | | | |
| 70 hr./100° C | | | 66.6 | | | | | | 66.7 | | | | | | 60.6 | | | |

| | 4 | | | | | | 5 | | | | | | 6 | | | | | | 7 | | | | | |
|---|---|---|---|---|---|---|---|---|---|---|---|---|---|---|---|---|---|---|---|---|---|---|---|---|
| | F | D | M, 200 | M, 300 | H | E | F | D | M, 200 | M, 300 | H | E | F | D | M, 200 | M, 300 | H | E | F | D | M, 200 | M, 300 | H | E |
| 10 minutes at 120° C | 5 | 250 | 4 | ----- | 32 | 46 | 5 | 260 | 3 | ----- | 30 | 48 | 5 | 350 | 4 | 3 | 35 | 47 | 5 | 250 | 3 | ----- | 31 | 48 |
| 20 minutes at 120° C | 5 | 430 | 5 | 5 | 37 | 48 | 5 | 290 | 3 | ----- | 31 | 48 | 25 | 720 | 11 | 15 | 47 | 47 | 5 | 290 | 3 | ----- | 31 | 48 |
| 30 minutes at 120° C | 10 | 690 | 8 | 9 | 45 | 48 | 5 | 500 | 4 | 4 | 35 | 48 | 85 | 830 | 21 | 30 | 54 | 48 | 5 | 170 | 6 | 6 | 32 | 48 |
| 45 minutes at 120° C | 50 | 800 | 15 | 23 | 51 | 48 | 25 | 780 | 9 | 13 | 45 | 48 | 100 | 840 | 25 | 34 | 56 | 48 | 5 | 520 | 8 | 10 | 40 | 48 |
| 60 minutes at 120° C | 80 | 850 | 19 | 30 | 52 | 48 | 50 | 810 | 15 | 22 | 50 | 48 | 130 | 850 | 27 | 44 | 59 | 49 | 15 | [illegible] | 13 | 19 | 45 | 48 |
| 75 minutes at 120° C | 115 | 830 | 25 | 41 | 56 | 49 | 95 | 730 | 23 | 37 | 55 | 48 | 145 | 860 | 39 | 55 | 60 | 49 | 35 | [illegible] | [illegible] | [illegible] | 5 | 48 |
| 90 minutes at 120° C | 135 | 760 | 32 | 51 | 58 | 57 | 115 | 630 | 33 | 54 | 60 | 50 | 150 | 720 | 45 | 62 | 61 | 50 | 75 | 790 | [illegible] | 30 | 54 | 49 |
| 5 minutes at 150° C | 5 | 270 | 6 | ----- | 39 | 48 | 5 | 260 | 4 | ----- | 33 | 48 | 65 | 810 | 18 | 29 | 52 | 48 | 5 | 270 | 4 | ----- | 32 | 48 |
| 10 minutes at 150° C | 5 | 150 | ----- | ----- | 37 | 47 | 5 | 270 | 4 | ----- | 31 | 48 | 125 | 760 | 31 | 51 | 58 | 48 | 5 | 260 | 4 | ----- | 33 | 48 |
| 15 minutes at 150° C | 135 | 780 | 29 | 47 | 56 | 49 | 125 | 720 | 30 | 49 | 57 | 49 | 140 | 630 | 44 | 69 | 62 | 49 | 70 | 859 | 18 | 28 | 53 | 49 |
| 20 minutes at 150° C | 145 | 660 | 37 | 60 | 60 | 50 | 145 | 590 | 43 | 69 | 61 | 51 | 140 | 520 | 55 | 74 | 65 | 50 | 125 | 850 | 26 | 43 | 57 | 50 |
| 30 minutes at 150° C | 145 | 520 | 50 | 79 | 63 | 51 | 135 | 470 | 54 | 85 | 64 | 51 | 145 | 500 | 60 | 79 | 66 | 50 | 150 | 720 | 35 | 57 | 61 | 51 |
| 45 minutes at 150° C | 150 | 520 | 60 | 95 | 64 | 53 | 130 | 360 | 67 | 104 | 57 | 53 | 145 | 440 | 64 | 86 | 66 | 51 | 150 | 560 | 48 | 77 | 63 | 51 |
| 60 minutes at 150° C | 145 | 410 | 69 | 111 | 66 | 53 | 140 | 360 | 74 | 118 | 67 | 53 | 145 | 440 | 72 | 100 | 67 | 52 | 150 | 460 | 60 | 95 | 66 | 51 |
| 75 minutes at 150° C | 145 | 400 | 69 | 111 | 66 | 53 | 135 | 330 | 77 | 123 | 69 | 52 | 150 | 420 | 73 | 115 | 68 | 51 | 145 | 420 | 63 | 49 | 66 | 51 |
| 90 minutes at 150° C | 150 | 370 | 73 | 119 | 67 | 53 | 140 | 330 | 74 | 126 | 69 | 54 | 150 | 420 | 75 | 120 | 69 | 51 | 140 | 410 | 68 | 108 | 67 | 52 |
| 5 minutes at 170° C | 150 | 770 | 32 | 53 | 58 | 49 | 145 | 680 | 35 | 57 | 59 | 48 | 140 | 680 | 39 | 51 | 60 | 47 | 100 | 840 | 21 | 34 | 55 | 48 |
| 10 minutes at 170° C | 150 | 580 | 47 | 77 | 62 | 51 | 145 | 500 | 53 | 85 | 64 | 51 | 145 | 560 | 50 | 82 | 62 | 49 | 145 | 680 | 37 | 62 | 61 | 49 |
| 15 minutes at 170° C | 135 | 490 | 57 | 92 | 64 | 51 | 145 | 430 | 62 | 100 | 65 | 52 | 150 | 460 | 55 | 93 | 63 | 50 | 160 | 590 | 46 | 75 | 63 | 49 |
| Scorch time (min.) at 120° C | | | 70 | | | | | | 75 | | | | | | 45 | | | | | | 90 | | | |
| Maximum modulus at 200% elongation time at 150° C. (limiting value 90 min./150° C., kg. wt./cm.²) | | | 73 | | | | | | 79 | | | | | | 75 | | | | | | 68 | | | |
| Blooming | | | None | | | | | | None | | | | | | Severe | | | | | | None | | | |
| Compression set (percent): | | | | | | | | | | | | | | | | | | | | | | | | |
| 22 hr./70° C | | | 8.3 | | | | | | 7.1 | | | | | | 10.5 | | | | | | 12.8 | | | |
| 70 hr./100° C | | | 63.4 | | | | | | 57.4 | | | | | | 69.5 | | | | | | 77.1 | | | |

As can be seen from the above data, especially the increase in modulus with the heating time, S,S′-carbonyl-bis-dialkyldithiophosphates (mixtures Nos. 1 to 5) are superior in their resistance to scorching and as regards blooming. Whilst zinc diethyldithiocarbamate (mixture No. 6) causes severe blooming, the vulcanizates obtained with S,S′ - carbonyl-bis-dialkyldithiophosphates remain clear on the surface. In addition S,S′-carbonyl-bis-di-n-butyl dithiophosphate (mixture No. 6) has advantages as regards the modulus level and compression set of the vulcanizates. When compared with mixture No. 7 (which only contains 2-mercaptobenzothiazole and tetramethylthiuramic monosulphide as accelerators, which also does not give rise to blooming, the advantages of S,S'-carbonyl-bis-dialkyldithiophosphates as regards vulcanization rate and the mechanical properties obtained, especially the compression set, become very clear.

EXAMPLE 2

The following EPDM rubber mixture was prepared in an internal mixer in the usual manner:

| | Parts by weight |
|---|---|
| A rapidly vulcanizing type of EPDM containing ethylidene norbornene as diene component (Keltan 512) | 100.0 |
| A furnace black which improves the extrudability of the mixture (FEF carbon black, Corax A) | 60.0 |
| An aliphatic mineral oil (Ingraplast NS) | 20.0 |
| Zinx oxide | 5.0 |
| Stearic acid | 1.0 |
| Sulphur | 1.5 |

| | Parts by weight |
|---|---|
| 2-mercaptobenzothiazole | 0.5 |
| Tetramethyl-thiuramic monosulphide | 0.4 |

The following accelerators were then mixed on a mill Mixture No.—

| | |
|---|---|
| 1: S,S' - carbonyl - bis - dimethyl dithiophosphate | 1.2 |
| 2: S,S'-carbonyl-bis-diethyldithiophosphate | 1.2 |
| 3: S,S'-carbonyl - bis - di-n-propyl-dithiophosphate | 1.2 |
| 4: S,S'-carbonyl - bis - di-isopropyl-dithiophosphate | 1.2 |
| 5: S,S'-carbonyl - bis - di - (2-methoxyethyl)-dithiophosphate | 1.2 |
| 6: S,S' - carbonyl - bis - di-n-butyl dithiophosphate | 1.2 |
| 7: Zinc diethyl dithiocarbamate | 1.2 |
| 8: Without additive | -- |

Stepwise heating at 120° C., 150° C. and 170° C. was carried out with the above mixtures and the following data were obtained:

TABLE 3

| | Mixture number | | | | | | | | | | | | | | | | | | | | | | | |
|---|---|---|---|---|---|---|---|---|---|---|---|---|---|---|---|---|---|---|---|---|---|---|---|---|
| | 1 | | | | | | 2 | | | | | | 3 | | | | | | 4 | | | | | |
| | F | D | M, 200 | M, 300 | H | E | F | D | M, 200 | M, 300 | H | E | F | D | M, 200 | M, 300 | H | E | F | D | M, 200 | M, 300 | H | E |
| 5 minutes at 120° C | 10 | 230 | 4 | ----- | 35 | 48 | 10 | 190 | ----- | ----- | 33 | 48 | 10 | 230 | 3 | ----- | 33 | 49 | 5 | 190 | ----- | ----- | 33 | 49 |
| 10 minutes at 120° C | 10 | 290 | 4 | ----- | 38 | 48 | 10 | 220 | 3 | ----- | 34 | 48 | 10 | 170 | ----- | ----- | 35 | 49 | 10 | 230 | 3 | ----- | 35 | 50 |
| 15 minutes at 120° C | 10 | 552 | 5 | 5 | 41 | 48 | 10 | 310 | 4 | 3 | 38 | 49 | 10 | 400 | 6 | 5 | 40 | 49 | 10 | 330 | 4 | 3 | 39 | 49 |
| 20 minutes at 120° C | 10 | 550 | 8 | 9 | 47 | 49 | 10 | 650 | 7 | 8 | 45 | 49 | 20 | 580 | 11 | 14 | 49 | 51 | 10 | 360 | 7 | 8 | 45 | 49 |
| 30 minutes at 120° C | 40 | 690 | 16 | 23 | 56 | 51 | 45 | 730 | 16 | 22 | 54 | 51 | 80 | 760 | 22 | 34 | 56 | 51 | 45 | 720 | 16 | 22 | 66 | 51 |
| 45 minutes at 120° C | 113 | 780 | 29 | 46 | 60 | 51 | 120 | 680 | 345 | 53 | 62 | 51 | 140 | 680 | 38 | 60 | 63 | 52 | 105 | 600 | 34 | 54 | 62 | 51 |
| 60 minutes at 120° C | 140 | 720 | 38 | 59 | 63 | 51 | 125 | 530 | 46 | 70 | 65 | 51 | 145 | 570 | 49 | 76 | 65 | 53 | 120 | 480 | 49 | 76 | 65 | 52 |
| 75 minutes at 120° C | 140 | 630 | 40 | 63 | 64 | 52 | 130 | 490 | 54 | 82 | 67 | 53 | 145 | 510 | 56 | 84 | 67 | 53 | 115 | 420 | 55 | 83 | 67 | 52 |
| 90 minutes at 120° C | 145 | 540 | 51 | 79 | 66 | 53 | 140 | 420 | 68 | 100 | 70 | 53 | 140 | 420 | 66 | 99 | 68 | 54 | 120 | 360 | 68 | 101 | 70 | 53 |
| 5 minutes at 150° C | 25 | 540 | 13 | 18 | 50 | 50 | 35 | 640 | 14 | 19 | 53 | 50 | 40 | 610 | 16 | 23 | 52 | 51 | 25 | 600 | 11 | 14 | 51 | 51 |
| 10 minutes at 150° C | 140 | 750 | 33 | 53 | 61 | 51 | 145 | 660 | 42 | 66 | 64 | 51 | 150 | 650 | 42 | 68 | 63 | 53 | 130 | 580 | 41 | 65 | 64 | 51 |
| 15 minutes at 150° C | 160 | 640 | 45 | 72 | 64 | 51 | 135 | 440 | 61 | 92 | 68 | 53 | 150 | 480 | 59 | 91 | 67 | 54 | 130 | 420 | 60 | 92 | 67 | 53 |
| 20 minutes at 150° C | 160 | 550 | 52 | 81 | 65 | 51 | 145 | 400 | 70 | 106 | 69 | 53 | 145 | 410 | 68 | 103 | 68 | 54 | 135 | 380 | 69 | 104 | 69 | 53 |
| 30 minutes at 150° C | 155 | 490 | 59 | 92 | 67 | 53 | 140 | 340 | 79 | 122 | 70 | 54 | 145 | 370 | 75 | 116 | 70 | 54 | 130 | 330 | 78 | 120 | 69 | 54 |
| 45 minutes at 150° C | 155 | 420 | 66 | 106 | 68 | 54 | 145 | 310 | 88 | 137 | 72 | 54 | 140 | 300 | 89 | 138 | 71 | 56 | 130 | 290 | 85 | ----- | 70 | 54 |
| 60 minutes at 150° C | 150 | 390 | 70 | 115 | 68 | 54 | 135 | 280 | 92 | ----- | 72 | 54 | 130 | 260 | 94 | ----- | 71 | 55 | 135 | 270 | 93 | ----- | 71 | 54 |
| 75 minutes at 150° C | 155 | 390 | 72 | 119 | 68 | 52 | 140 | 290 | 92 | ----- | 72 | 54 | 140 | 280 | 95 | ----- | 71 | 55 | 125 | 260 | 93 | ----- | 72 | 54 |
| 90 minutes at 150° C | 155 | 390 | 71 | 116 | 68 | 54 | 140 | 280 | 92 | ----- | 72 | 54 | 145 | 290 | 97 | ----- | 72 | 56 | 135 | 280 | 91 | ----- | 72 | 54 |
| 5 minutes at 170° C | 160 | 620 | 44 | 72 | 64 | 51 | 150 | 450 | 61 | 64 | 67 | 52 | 155 | 460 | 63 | 97 | 66 | 54 | 140 | 430 | 60 | 94 | 67 | 54 |
| 10 minutes at 170° C | 155 | 460 | 58 | 93 | 66 | 52 | 155 | 360 | 80 | 128 | 70 | 53 | 150 | 340 | 82 | 131 | 68 | 54 | 140 | 330 | 78 | 126 | 69 | 54 |
| 15 minutes at 170° C | 160 | 470 | 69 | 98 | 65 | 52 | 145 | 330 | 82 | 131 | 70 | 53 | 135 | 300 | 81 | 130 | 69 | 54 | 134 | 300 | 79 | 129 | 69 | 54 |
| Scorch time at 120° C, (min.) | | | 38 | | | | | | 35.5 | | | | | | 31.0 | | | | | | 36.0 | | | |
| Maximum modulus at 200% elongation at 150° C. (limiting value 90'/150° C., kg. wt./cm.²) | | | 72 | | | | | | 92 | | | | | | 97 | | | | | | 91 | | | |
| Blooming | | | None | | | | | | None | | | | | | None | | | | | | None | | | |
| Compression set (percent): | | | | | | | | | | | | | | | | | | | | | | | | |
| 22 h./70° C | | | 12.8 | | | | | | 8.1 | | | | | | 8.1 | | | | | | 8.3 | | | |
| 70 h./100° C | | | 71.1 | | | | | | 49.8 | | | | | | 52.5 | | | | | | 40.0 | | | |

TABLE 3—Continued

| | Mixture number | | | | | | | | | | | | | | | | | | | | | | | |
|---|---|---|---|---|---|---|---|---|---|---|---|---|---|---|---|---|---|---|---|---|---|---|---|---|
| | 5 | | | | | | 6 | | | | | | 7 | | | | | | 8 | | | | | |
| | F | D | M, 200 | M, 300 | H | E | F | D | M, 200 | M, 300 | H | E | F | D | M, 200 | M, 300 | H | E | F | D | M, 200 | M, 300 | H | E |
| 5 minutes at 120° C | 10 | 170 | ----- | ----- | 37 | 50 | 5 | 190 | ----- | ----- | 33 | 48 | 5 | 180 | 4 | ----- | 33 | 48 | 10 | 130 | ----- | ----- | 35 | 50 |
| 10 minutes at 120° C | 10 | 460 | 8 | 7 | 45 | 51 | 10 | 280 | 4 | ----- | 37 | 48 | 30 | 650 | 12 | 29 | 45 | 49 | 10 | 140 | ----- | ----- | 39 | 50 |
| 15 minutes at 120° C | 35 | 660 | 16 | 22 | 53 | 51 | 10 | 460 | 6 | 6 | 44 | 48 | 35 | 720 | 30 | 48 | 54 | 49 | 10 | 320 | 6 | 6 | 45 | 50 |
| 20 minutes at 120° C | 90 | 770 | 25 | 39 | 58 | 51 | 35 | 680 | 14 | 19 | 51 | 50 | 95 | 510 | 48 | 63 | 58 | 49 | 25 | 620 | 13 | 17 | 52 | 51 |
| 30 minutes at 120° C | 140 | 750 | 35 | 56 | 62 | 53 | 110 | 720 | 28 | 45 | 60 | 51 | 120 | 470 | 54 | 81 | 61 | 50 | 95 | 820 | 24 | 38 | 58 | 51 |
| 45 minutes at 120° C | 155 | 590 | 48 | 76 | 65 | 53 | 130 | 540 | 46 | 71 | 65 | 53 | 135 | 460 | 62 | 94 | 63 | 50 | 150 | 700 | 40 | 63 | 64 | 52 |
| 60 minutes at 120° C | 155 | 530 | 56 | 86 | 66 | 54 | 130 | 460 | 58 | 88 | 67 | 53 | 140 | 410 | 69 | 97 | 65 | 51 | 155 | 630 | 47 | 72 | 65 | 53 |
| 75 minutes at 120° C | 155 | 470 | 63 | 95 | 68 | 54 | 125 | 400 | 64 | 95 | 69 | 54 | 135 | 390 | 72 | 89 | 65 | 52 | 150 | 560 | 59 | 82 | 67 | 54 |
| 90 minutes at 120° C | 150 | 410 | 72 | 108 | 69 | 54 | 120 | 330 | 74 | 109 | 70 | 54 | 130 | 350 | 74 | 101 | 66 | 53 | 145 | 460 | 60 | 91 | 68 | 54 |
| 5 minutes at 150° C | 130 | 800 | 30 | 49 | 59 | 51 | 65 | 670 | 19 | 30 | 54 | 51 | 110 | 610 | 23 | 34 | 53 | 51 | 60 | 699 | 20 | 30 | 55 | 51 |
| 10 minutes at 150° C | 160 | 570 | 54 | 85 | 65 | 53 | 145 | 570 | 47 | 74 | 65 | 52 | 130 | 550 | 63 | 80 | 66 | 52 | 160 | 700 | 42 | 67 | 64 | 51 |
| 15 minutes at 150° C | 150 | 420 | 66 | 101 | 68 | 54 | 145 | 430 | 67 | 100 | 68 | 54 | 135 | 430 | 68 | 87 | 67 | 53 | 150 | 500 | 58 | 89 | 67 | 53 |
| 20 minutes at 150° C | 155 | 400 | 74 | 114 | 68 | 54 | 135 | 360 | 73 | 111 | 69 | 54 | 135 | 420 | 74 | 94 | 68 | 54 | 150 | 450 | 64 | 98 | 68 | 54 |
| 30 minutes at 150° C | 145 | 360 | 82 | 129 | 70 | 54 | 135 | 320 | 82 | 127 | 70 | 54 | 140 | 350 | 80 | 110 | 69 | 54 | 150 | 400 | 72 | 109 | 70 | 53 |
| 45 minutes at 150° C | 145 | 310 | 90 | 143 | 70 | 54 | 135 | 280 | 90 | ----- | 70 | 54 | 140 | 320 | 83 | 123 | 69 | 54 | 150 | 350 | 80 | 127 | 71 | 54 |
| 60 minutes at 150° C | 140 | 280 | 94 | ----- | 71 | 56 | 145 | 280 | 96 | ----- | 71 | 55 | 145 | 270 | 87 | ----- | 70 | 54 | 145 | 330 | 83 | 132 | 71 | 54 |
| 75 minute at 150° C | 140 | 280 | 95 | ----- | 71 | 56 | 130 | 260 | 95 | ----- | 71 | 54 | 130 | 260 | 89 | ----- | 70 | 54 | 140 | 300 | 87 | ----- | 71 | 54 |
| 90 minutes at 150° C | 150 | 300 | 94 | 148 | 72 | 55 | 135 | 270 | 96 | ----- | 72 | 54 | 130 | 270 | 90 | ----- | 70 | 54 | 140 | 310 | 84 | 132 | 71 | 54 |
| 5 minutes at 170° C | 160 | 440 | 68 | 107 | 67 | 54 | 135 | 400 | 66 | 101 | 67 | 52 | 140 | 410 | 69 | 102 | 68 | 51 | 160 | 530 | 58 | 90 | 66 | 51 |
| 10 minutes at 170° C | 155 | 350 | 84 | 136 | 69 | 54 | 140 | 330 | 81 | 131 | 69 | 54 | 135 | 340 | 79 | 125 | 68 | 53 | 155 | 400 | 72 | 155 | 69 | 53 |
| 15 minutes at 170° C | 150 | 330 | 85 | 137 | 69 | 54 | 135 | 290 | 86 | ----- | 69 | 54 | 135 | 330 | 79 | ----- | 69 | 54 | 155 | 380 | 77 | 125 | 69 | 54 |
| Scorch time at 120° C. (min.) | | | 19.5 | | | | | | 26.5 | | | | | | 14 | | | | | | 30 | | | |
| Maximum modulus at 200% elongation at 150° C. (limiting value 90'/150° C., kg. wt./cm.²) | | | 94 | | | | | | 95 | | | | | | 90 | | | | | | 87 | | | |
| Blooming | | | None | | | | | | None | | | | | | Severe | | | | | | None | | | |
| Compression set (percent): | | | | | | | | | | | | | | | | | | | | | | | | |
| 22 h./70° C | | | 8.0 | | | | | | 8.0 | | | | | | 10.2 | | | | | | 11.3 | | | |
| 70 h./100° C | | | 50.2 | | | | | | 49.2 | | | | | | 65.3 | | | | | | 67.8 | | | |

EXAMPLE 3

The following mixture was prepared in an internal mixer in the usual manner:

| | Parts by weight |
|---|---|
| A slowly vulcanizing type of EPDM containing dicyclopentadiene as diene component (Keltan 520) | 100.0 |
| A furnace black which improves the extrudability of the mixture (Corax A, FEF carbon black) | 60.0 |
| An aliphatic mineral oil (Ingraplast NS) | 20.0 |
| Zinc oxide | 5.0 |
| Stearic acid | 1.0 |
| Sulphur | 1.5 |
| 2-mercaptobenzothiazole | 0.5 |
| Tetramethyl thiuram monosulphide | 0.4 |
| Diphenylthiourea | 1.0 |

The accelerators were then mixed on a mill (parts by weight based on 100.0 parts by weight of rubber):

Mixture No.—
1: S,S'-carbonyl-bis-n-butyl dithiophosphate --- 1.2
2: Zinc diethyl dithiocarbamate --- 1.2

Stepwise vulcanization was carried out at 120° C. and 150° C. with the above mixtures and the following data were obtained:

TABLE 4

| | Mixture number | | | | | | | | | | |
|---|---|---|---|---|---|---|---|---|---|---|---|
| | 1 | | | | | | 2 | | | | |
| | F | D | M 200 | M 300 | H | E | F | D | M 200 | M 300 | H | E |
| 5 minutes at 120° C | 10 | 220 | 4 | ---- | 36 | 48 | 10 | 200 | 5 | ---- | 37 | 47 |
| 10 minutes at 120° C | 15 | 710 | 9 | 10 | 45 | 48 | 25 | 680 | 24 | 35 | 46 | 48 |
| 20 minutes at 120° C | 60 | 850 | 16 | 23 | 52 | 48 | 75 | 750 | 30 | 42 | 48 | 48 |
| 30 minutes at 120° C | 115 | 860 | 23 | 38 | 56 | 48 | 100 | 730 | 36 | 48 | 50 | 48 |
| 45 minutes at 120° C | 155 | 800 | 31 | 50 | 59 | 48 | 135 | 700 | 40 | 55 | 53 | 49 |
| 60 minutes at 120° C | 165 | 660 | 42 | 666 | 61 | 50 | 150 | 680 | 44 | 60 | 59 | 50 |
| 76 minutes at 120° C | 170 | 610 | 48 | 76 | 63 | 51 | 160 | 660 | 46 | 76 | 51 | 50 |
| 90 minutes at 120° C | 155 | 565 | 50 | 77 | 64 | 51 | 160 | 620 | 49 | 73 | 62 | 50 |
| 5 minutes at 150° C | 124 | 390 | 24 | 40 | 56 | 48 | 120 | 700 | 34 | 49 | 58 | 48 |
| 10 minutes at 150° C | 170 | 720 | 39 | 62 | 60 | 48 | 150 | 670 | 42 | 57 | 59 | 49 |
| 15 minutes at 150° C | 170 | 590 | 49 | 77 | 62 | 49 | 155 | 610 | 47 | 64 | 60 | 50 |
| 20 minutes at 150° C | 160 | 510 | 56 | 87 | 65 | 51 | 155 | 660 | 51 | 73 | 62 | 50 |
| 30 minutes at 150° C | 150 | 520 | 60 | 86 | 62 | 51 | 150 | 520 | 60 | 86 | 62 | 51 |
| 45 minutes at 150° C | 150 | 360 | 77 | 121 | 68 | 51 | 150 | 460 | 72 | 90 | 63 | 51 |
| 60 minutes at 150° C | 155 | 380 | 79 | 127 | 69 | 53 | 150 | 410 | 75 | 111 | 65 | 52 |
| 75 minutes at 150° C | 150 | 320 | 86 | 137 | 69 | 53 | 150+390 | | 79 | 120 | 67 | 52 |
| 90 minutes at 150° C | 160 | 340 | 87 | 140 | 70 | 53 | 150 | 380 | 81 | 135 | 68 | 52 |
| Scorch time at 120° C. (min.) | | | 23 | | | | | | 12 | | | |
| Maximum modulus at 200% elongation at 150° C. (limiting value 90'/150° C. kg. wt./cm.²) | | | 87 | | | | | | 81 | | | |
| Blooming | | | None | | | | | | Severe | | | |

EXAMPLE 4

1117 g. (15.5 mol) of n-butanol are added dropwise to 860 g. (3.87 mol) of phosphorus pentasulphide at 20° C. (cooling with water) with stirring. Stirring is then continued at 50° C. until the evolution of hydrogen sulphide has ceased. The reaction mixture is cooled to room temperature, degasified under vacuum and filtered. 1775 g. of dibutyldithiophosphoric acid (97% of the theory) are obtained.

820 g. (3.1 mol) of sodium-di-n-butyl dithiophosphate which can be prepared by treating dibutyldithiophosphoric acid with aqueous sodium hydroxide solution in the usual manner are reacted with 153.5 g. (1.55 mol) of phosgene in 1.6 l. of water at −5° C. to 0° C. Stirring is continued for 2 hours at 0° C. and the reaction fixture is then made slightly alkaline and extracted by shaking it 3 times with methylene chloride. The combined methylene chloride solutions are washed with water, dried over sodium sulphate and evaporated under vacuum. 803 g. of a pale yellow oil, amounting to 100% of the theory (based on the amount of sodium dibutyldithiophosphate put into the reaction) of S,S'-carbonyl-bis-di-n-butyldithiophosphate are obtained;

$n_D^2$ 1.5265.

$C_{17}H_{36}O_5P_2S_4$ (510.7): Calc. (percent): C, 40.0; H, 7.1; O, 15.7; P, 12.1; S, 25.1. Found (percent): C, 39.8; H, 7.2; O, 16.5; P, 12.1; S, 24.5.

The following compounds were synthesized in analogous manner:

S,S'-carbonyl-bis-di-methyl-dithiophosphate; $n_D^{20}$ 1.5438
$C_5H_{12}O_5P_2S_4$ (311.4): Calc. (percent): C, 19.3; H, 3.39. Found (percent): C, 19.7; H, 4.6.

S,S'-carbonyl-bis-di-ethyl-dithiophosphate; $n_D^{20}$ 1.5249
$C_9H_{20}O_5P_2S_4$ (398.5): Calc. (percent): C, 27.1; H, 5.1. Found (percent): C, 26.4; H, 5.1.

S,S'-carbonyl-bis-di-isopropyl-dithiophosphate; M.P. 82–83° C.
$C_{13}H_{28}O_5P_2S_4$ (454.6)

S,S'-carbonyl-bis-di-n-propyl-dithiophosphate; $n_D^{20}$ 1.5239
$C_{13}H_{28}O_5P_2S_4$ (454.6): Calc. (percent): C, 34.4; H, 6.2. Found (percent): C, 34.0; H, 6.6.

S,S'-carbonyl-bis-di-(2-methoxyethyl)-dithiophosphate; $n_D^{20}$ 1.5371
$C_{13}H_{28}O_5P_2S_4$ (518.6): Calc. (percent): C, 30.1; H, 5.4. Found (percent): C, 30.2; H, 5.4.

S,S'-carbonyl-bis-di-n-pentyl-dithiosphosphate; $n_D^{20}$ 1.5173
$C_{21}H_{44}O_5P_2S_4$ (566.8): Calc. (percent): C, 44.5; H, 7.8. Found (percent): C, 45.2; H, 81.1.

S,S'-carbonyl-bis-di-n-hexyl-dithiophosphate; $n_D^{20}$ 1.4961
$C_{25}H_{52}O_5P_2S_4$ (622.9): Calc. (percent): C, 48.2; H, 8.4. Found (percent): C, 49.2; H, 9.3.

S,S'-carbonyl-bis-di-isobutyl-dithiophosphate; $n_D^{20}$ 1.5203
$C_{17}H_{36}O_5P_2S_4$ (510.7): Calc. (percent): C, 40.0; H, 7.1. Found (percent): C, 40.4; H, 7.2.

When using an alcoholic mixture of 50 percent by weight of n-butanol and 50 percent by weight of isobutanol, a product which has the following data is obtained:

$C_{17}H_{36}O_5P_2S_4$ (510.7): Calc. (percent): C, 40.0; H, 7.1. Found (percent): C, 39.8; H, 7.2. $n_D^{20}$ 1.5258

When an alcoholic mixture of 50% by weight of n-butanol and 50 percent by weight of n-pentanol is used, a reaction product which has the following overall composition is obtained:

$C_{19}H_{40}O_5P_2S_4$ (538.7): Calc. (percent): C, 42.4; H, 7.47. Found (percent): C, 52.5; H, 7.6. $n_D^{20}$ 1.5222

What is claimed is:

1. In the process of vulcanizing an ethylene-propylene terpolymer in which the vulcanization is effected in the presence of sulphur or a sulphur donor, the improvement which comprises employing as vulcanization accelerator
   (a) a compound of the formula

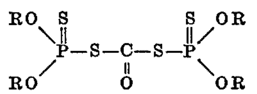

wherein each R is alkyl having 1 to 6 carbon atoms or alkoxyalkyl having 1 to 4 carbon atoms in the alkoxy moiety and 1 to 6 carbon atoms in the alkyl moiety and (b) a thiazole accelerator.

2. The process of claim 1 wherein (b) is 2-mercaptobenzothiazole, dibenzothiazyl disulphide or the zinc salt of 2-mercaptobenzothiazole.

3. The process of claim 2 wherein said vulcanization accelerator contains, based on the weight of said terpolymer, 0.1 to 5.0% by weight of (a) and 0.2 to 2.0% by weight of (b).

4. The process of claim 3 wherein said vulcanization accelerator also contains up to 2.0% by weight of (c) tetramethylthiuram disulphide, tetraethylthiuram disulphide, tetramethylthiuramic monosulphide or dimethyldiphenylthiuramic disulphide and up to 2.0% by weight of (d) a thiourea.

5. The process of claim 4 wherein (a) is S,S'-carbonyl-bis-di-n-butyl dithiophosphate ,(b) is 2-mercaptobenzothiazole, (c) is tetramethylthiuram monosulphide and (d) is diphenylthiourea.

References Cited

UNITED STATES PATENTS

| | | | |
|---|---|---|---|
| 3,419,521 | 12/1968 | Scott | 260—41.5 |
| 3,629,210 | 12/1971 | Apotheker | 260—79.5 |

JOSEPH L. SCHOFER, Primary Examiner

C. A. HENDERSON, Jr., Assistant Examiner

U.S. Cl. X.R.

252—182; 260—783, 785